Dec. 20, 1927.
B. S. T. BISHOP
BELT SHIPPER
Filed Feb. 6, 1925
1,653,250
3 Sheets-Sheet 1
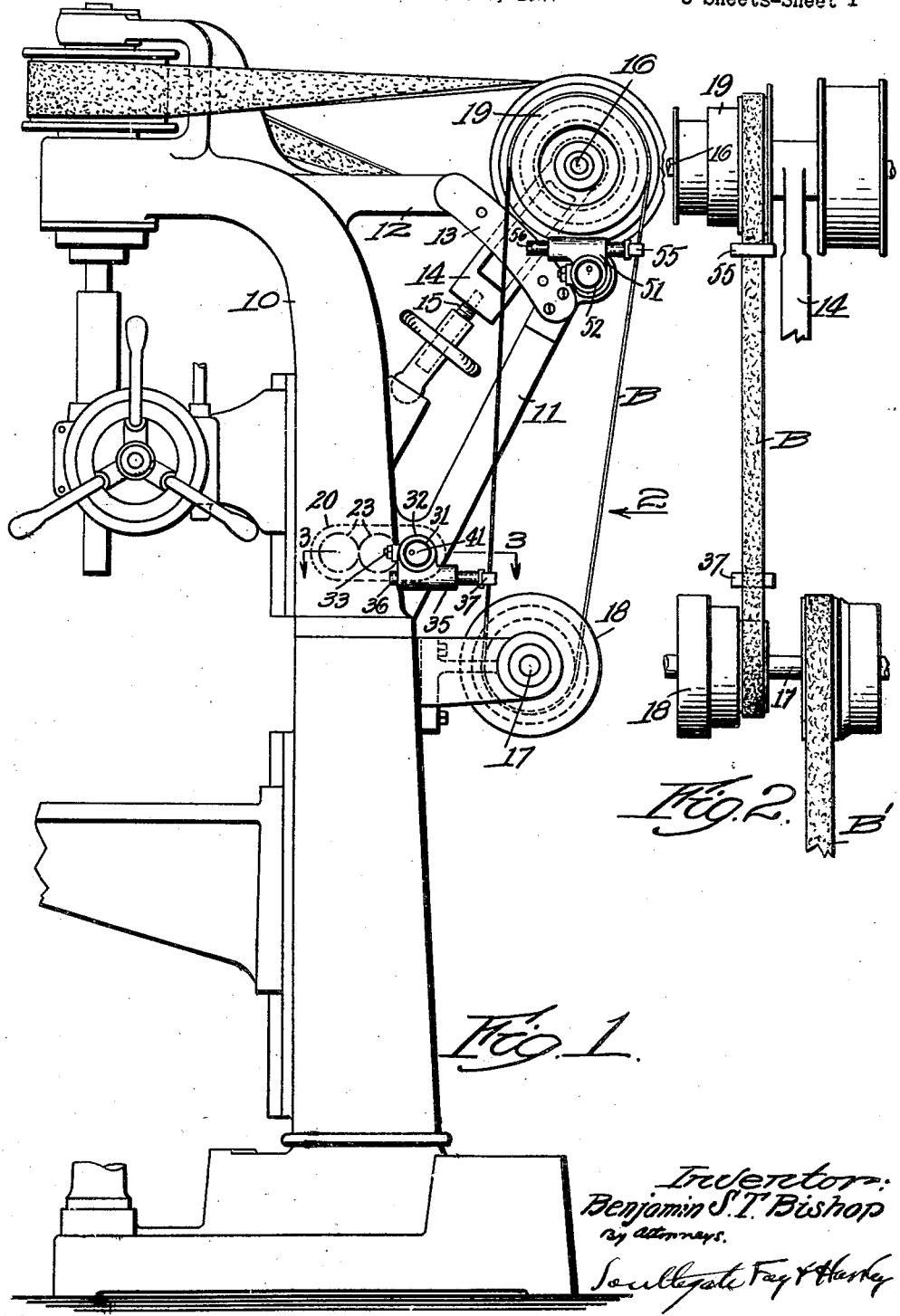

Dec. 20, 1927.
B. S. T. BISHOP
1,653,250
BELT SHIPPER
Filed Feb. 6, 1925
3 Sheets-Sheet 2
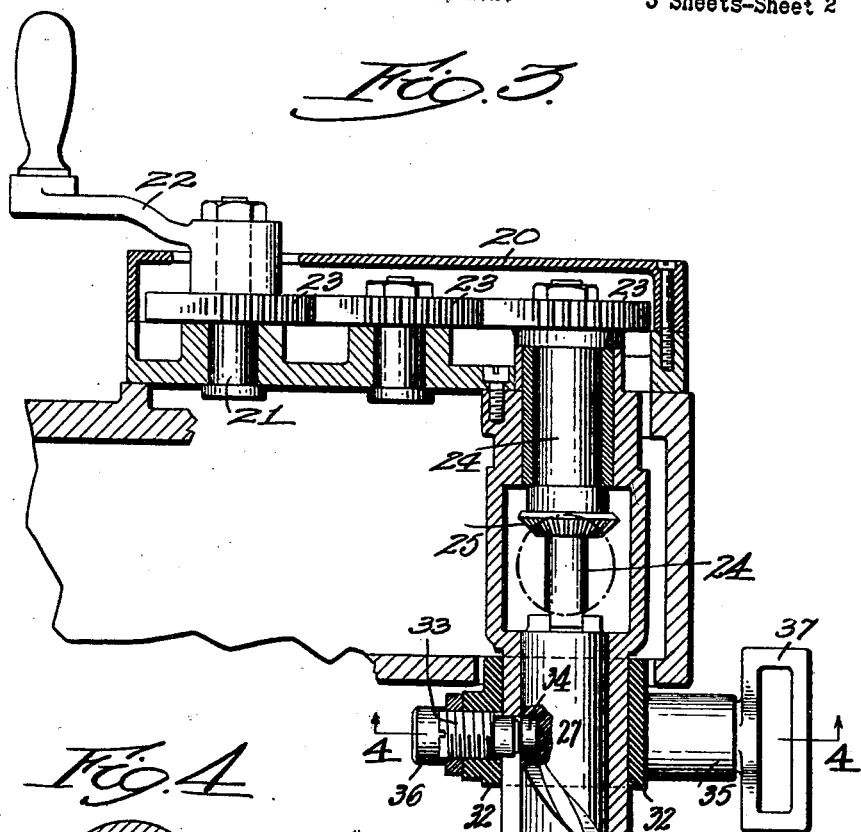
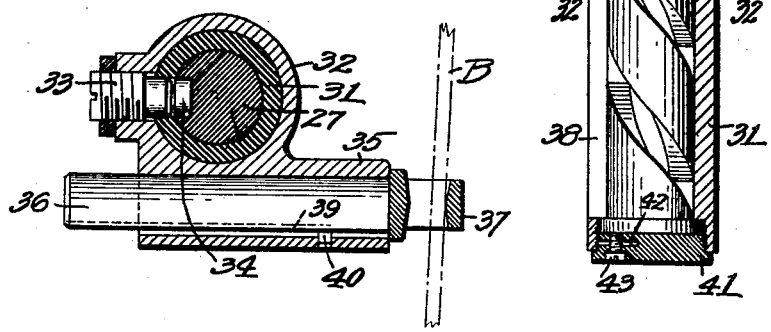
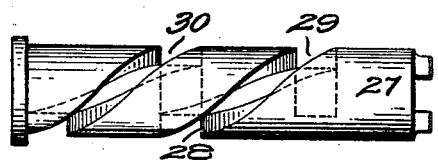

Dec. 20, 1927.
B. S. T. BISHOP
BELT SHIPPER
Filed Feb. 6, 1925
1,653,250
3 Sheets-Sheet 3
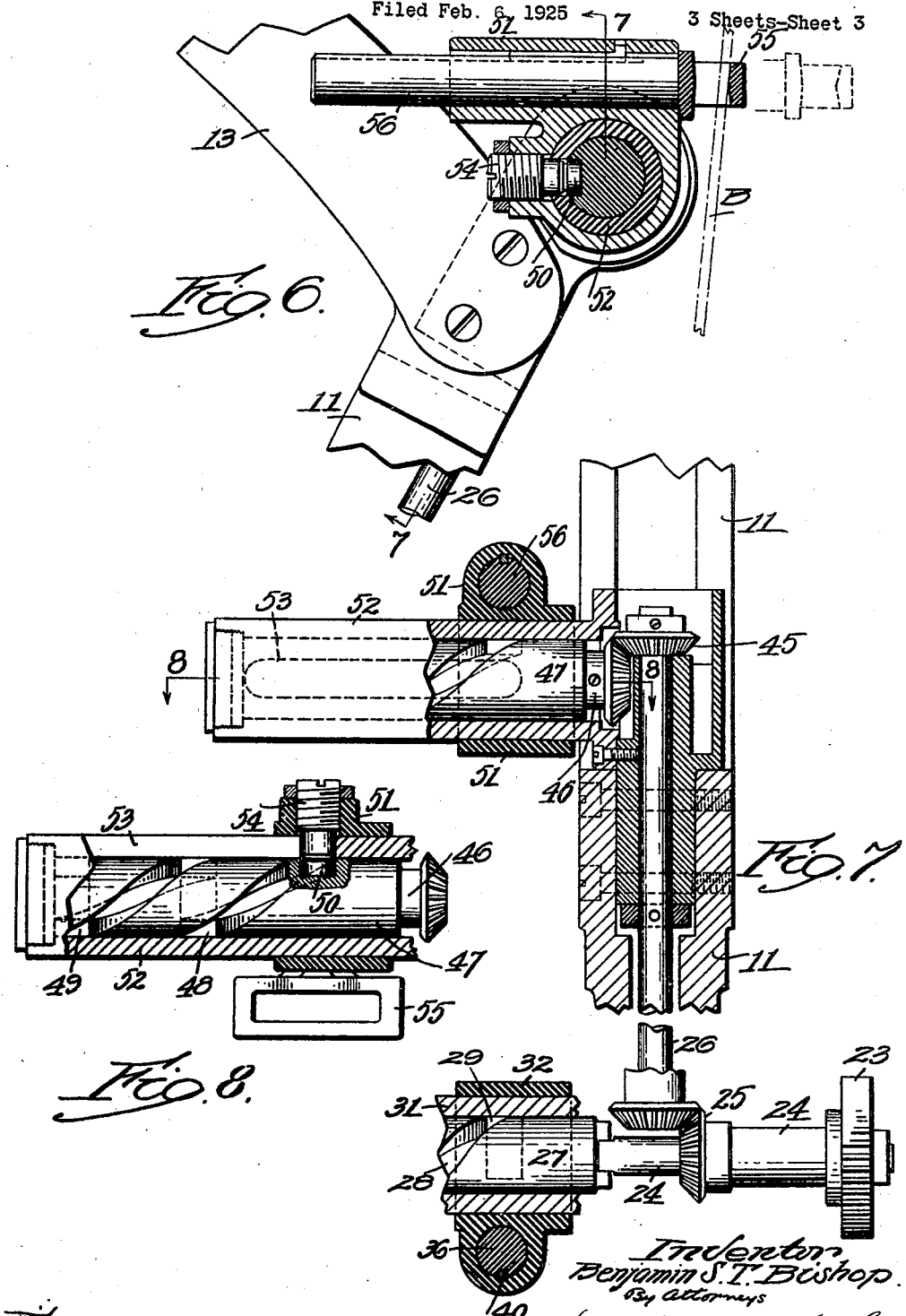

Patented Dec. 20, 1927.

1,653,250

UNITED STATES PATENT OFFICE.

BENJAMIN S. T. BISHOP, OF SHREWSBURY, MASSACHUSETTS, ASSIGNOR TO LELAND-GIFFORD COMPANY, OF WORCESTER, MASSACHUSETTS, A CORPORATION OF MASSACHUSETTS.

BELT SHIPPER.

Application filed February 6, 1925. Serial No. 7,366.

The principal objects of this invention are to provide a mechanical device for this purpose which will shift the two strands of the belt at different times to provide the necessary dwell and cause the belt to be shifted substantially the same as by manual operation; and to provide it in such a manner that it will be sure to operate and will be sufficiently flexible to permit the belt to move forward and back without interfering with the shipping operation.

Other objects and advantages of the invention will appear hereinafter.

Reference is to be had to the accompanying drawings, in which

Fig. 1 is a side view of a drill with a preferred embodiment of this invention applied thereto for both strands of the belt;

Fig. 2 is an edge view of the same;

Fig. 3 is an enlarged sectional view on the line 3—3 of Fig. 1, showing the lower shipper;

Fig. 4 is a sectional view on the line 4—4 of Fig. 3;

Fig. 5 is a side view of the belt shipper cam removed;

Fig. 6 is an enlarged view of the upper shipper partly in central longitudinal section;

Fig. 7 is a sectional view of the same on the broken line 7—7 of Fig. 6; and

Fig. 8 is a sectional view on the line 8—8 of Fig. 7.

I have shown the invention as applied to the belt B of an upright drill although it is capable of use on machines of various kinds. In this case the goose neck 10 is provided with struts 11 and 12 holding a plate 13 which guides the tightening device 14 and adjusting screw 15. These do not constitute part of this invention except that the shipper is constructed so that it will work with equal efficiency in all adjusted positions of the driving shaft 16.

The driving shaft 17 is shown at the bottom which is driven by a motor or the like below by means of a driving belt B'. On this shaft 17 is a cone pulley 18 and on the shaft 16 there is a cone pulley 19 driven from the pulley 18 by the belt B. At a place near the bottom of the goose neck and near the pulley 18 is located a casing 20 in which there is a shaft 21 with a crank handle 22 thereon and driving, by means of gearing 23, the shaft 24. The shaft 24 is provided with a bevel gear 25 driving a shaft 26 which extends up through one of the struts 11.

The end of the shaft 24 is slabbed off and fits between two lugs on the end of a cylindrical belt shipper cam 27. This cam has a groove 28 of a helical nature but provided at the starting end and at the center with two circumferential grooves 29 and 30, each extending only half way around. This cam is located in a casing 31 fixed at the bottom of the goose-neck 10 in which it fits and turns. On the outside of this casing is a hollow circular slide 32 provided with a radial screw 33 having on the inner end a roll 34 which fits in this groove. The screw slides in a slot 38 in this casing 31. The end of the casing 31 is closed by a screw cap 41 which has a slit 42 and screw 43 for tightening it up in closed position.

When the slide 32 is drawn back as shown in Fig. 3 it abuts against the goose-neck which is its limiting position in one direction. The turning of the handle 22 will at first turn the cam idly with no motion on account of the semi-circumferential groove 29, but at the end of this groove the cam groove 28 takes the roll along the cam to a position about half way out and carries with it the slide 32. Then there is another dwell for about a half revolution and then a further motion of the slide out to the end of the casing 31.

The slide 32 has integrally connected with it a transverse guide 35 in which is a belt shipper finger 36 having a belt shipper or guide 37 on the end. This belt guide is merely a head having a slot through it for receiving the belt, the inner edges of the slot being bevelled as indicated in Fig. 4. This finger has a longitudinal groove 39 in which engages a key 40 on one side of the guide 35 to prevent the finger and belt guide from turning or twisting.

The shaft 26 as stated extends up through the hollow strut 11 and has a bevel gear 45 on the upper end which, through another bevel gear, drives a shaft 46 similar to the shaft 24 and having a belt shipper cam 47. This cam is made like the cam 27 except that the two semi-circular grooves 48 and 49 are located respectively near the center and at the outer end. There is none at the starting end. Therefore when this shaft starts to turn, which is simultaneous with the turning of the shaft 24, it immediately operates the roll 50 and slide 51 to move longitudinally to the center of its traverse and then dwell and a further turn takes it to the end when it is idle during the completion of the turning motion. The casing 52 in which this cam 47 is located has a slot 53 along which the screw 54 slides as in the other case and the other features are substantially the same. This has a belt guide 55 which is mounted on a belt shipper finger 56 and moves of course with it and is held against twisting in the same way as below. The two belt guides 37 and 55 are substantially alike. They are moved positively in the direction in which the belt is to be shipped and in the manner which has been described in connection with the description of the two cams. The fingers 36 and 56 on which these belt guides are mounted are able to move out and in accordance with the position of the belt. The belt itself causes these motions and this prevents binding of the parts.

When it is desired to ship the belt from the position shown in Fig. 2 on to the next step of the two cones, the handle 22 is operated, rotating both the cams 27 and 47. The first action is to move the upper belt guide 55 over to the left in Fig. 2 about half the distance of the total traverse of that belt guide and then it is caused to dwell by the groove 48. Just at this time the lower belt guide 37, which was not moved during this period, is now moved forward while the upper belt guide is stationary. This leaves the belt on the second steps of the two cone pulleys.

If the next operation is to ship back again the handle is merely turned in the opposite direction as far as it will go but if the next operation is to ship the belt up another step on the pulleys the handle is turned in the same direction and the upper belt guide moves over to the end of the stroke and dwells in the groove 49. The lower belt guide during this movement is stationary in the groove 30 and then it moves throughout the rest of its stroke while the upper belt guide is stationary.

This provides as near as can be done a motion similar to the hand shipping of a belt. The belt must be moved first from the larger step of the cone to the next one so as to give enough length to ship the other end from a smaller step of the cone to a larger one and each one is performed while the dwell is taking place at the other end of the belt. As the belt guides have to remain where the belt is, the belt shipping mechanism has to be left in that position during the running.

For adjustment the rolls 34 and 50 have to be pulled out of the cams. This is done by withdrawing the screws 33 and 54 by means of a screw driver or the like.

Although I have illustrated and described only a single form of the invention and shown it as applied to a specific machine, I am aware of the fact that modifications can be made therein by any person skilled in the art, and that it can be applied to many types of machines, without departing from the scope of the invention as expressed in the claims. Therefore I do not wish to be limited in these respects but what I do claim is:—

1. In a belt shipper, the combination of a shaft, manual means for rotating the shaft, a cylindrical cam, a casing in which the cam is mounted to rotate, means for connecting the shaft with the cam for rotating it, said cam having a partially circumferential groove and a helical groove connected therewith, a roll extending into the cam through the casing, the casing having a longitudinal slot for receiving said roll and guiding it longitudinally of the casing, whereby the roll will be caused to move forward along the casing during a part of the rotation of the cam and will be held against movement during another part of the rotation, a slide carrying said roll and guided by the casing, and a belt shipper guide carried by the slide and movable therewith.

2. In a drill, the combination with a freely mounted shaft having a cone pulley thereon, a pivoted strut carrying said shaft, and means for holding the strut against motion lengthwise of the shaft but allowing it to swing laterally, of a second shaft, manual means for rotating the latter shaft, a second cone pulley, a pair of belt shipper units, each comprising a cylindrical cam, means whereby the rotation of the second shaft will simultaneously rotate both cams, a slide located adjacent to each cam and movable therealong, and a belt shipper guide carried by each slide, one belt shipper guide for operating one strand of the belt near one end and the other for operating the other strand of the belt near the other end, irrespective of the position of the first named shaft and pulley.

3. In a drill, the combination with a freely mounted shaft having a cone pulley thereon, a pivoted strut carrying said shaft, and means for holding the strut against motion lengthwise of the shaft but allowing it to swing laterally with the strut, of a second shaft, a second cone pulley, a pair of belt shipper units, means whereby the rotation of the second shaft will simultaneously operate both units, and a belt shipper guide carried by each unit, one belt shipper guide for operating one strand of the belt near one end and the other for operating the other strand of the belt near the other end, irrespective of the adjustment of the first named shaft and pulley about the pivot of said strut.

In testimony whereof I have hereunto affixed my signature.

BENJAMIN S. T. BISHOP.